(12) United States Patent
Niedermeier et al.

(10) Patent No.: US 10,071,817 B2
(45) Date of Patent: Sep. 11, 2018

(54) INDICATION BOLT FOR MONITORING ADHESIVE BONDS IN STRUCTURAL ELEMENTS

(71) Applicant: Airbus Defence and Space GmbH, Ottobrunn (DE)

(72) Inventors: Stefan Niedermeier, Landshut (DE); Thomas Koerwien, Hoehenkirchen (DE)

(73) Assignee: Airbus Defence and Space GmbH, Ottobrunn (DE)

( * ) Notice: Subject to any disclaimer, the term of this patent is extended or adjusted under 35 U.S.C. 154(b) by 100 days.

(21) Appl. No.: 14/649,830

(22) PCT Filed: Dec. 2, 2013

(86) PCT No.: PCT/DE2013/000714
§ 371 (c)(1),
(2) Date: Jun. 4, 2015

(87) PCT Pub. No.: WO2014/086331
PCT Pub. Date: Jun. 12, 2014

(65) Prior Publication Data
US 2015/0307205 A1    Oct. 29, 2015

(30) Foreign Application Priority Data
Dec. 5, 2012  (DE) .................. 10 2012 023 717

(51) Int. Cl.
*B25G 3/00*    (2006.01)
*F16C 11/06*    (2006.01)
(Continued)

(52) U.S. Cl.
CPC ............ *B64D 45/00* (2013.01); *F16B 11/006* (2013.01); *F16B 19/02* (2013.01); *F16B 31/02* (2013.01); *F16B 5/04* (2013.01); *Y10T 403/20* (2015.01)

(58) Field of Classification Search
CPC . B64D 45/00; F16B 31/02; F16B 5/04; F16B 11/006; F16B 19/02; Y10T 403/20
(Continued)

(56) References Cited

U.S. PATENT DOCUMENTS 4,220,092 A * 9/1980 Smith ................ F42B 12/50
102/529
5,019,196 A * 5/1991 McKibben ............ B22C 5/0472
156/299
(Continued)

FOREIGN PATENT DOCUMENTS

DE    42 21 607 C1    9/1993
DE    195 39 685 A1    5/1996
(Continued)

OTHER PUBLICATIONS

US 5,776,584, 07/1998, Haraga et al. (withdrawn)
(Continued)

*Primary Examiner* — Amber Anderson
*Assistant Examiner* — Nahid Amiri
(74) *Attorney, Agent, or Firm* — Crowell & Moring LLP

(57) ABSTRACT

A structural element includes a first component and a second component; a bonded joint, by which the first component and the second component are interconnected; and an indication bolt, which is fixed to the first component and the second component. The indication bolt is designed to indicate when the first component and the second component have moved relative one another.

11 Claims, 4 Drawing Sheets

(51) Int. Cl.
  *F16D 1/00* (2006.01)
  *F16G 11/00* (2006.01)
  *B64D 45/00* (2006.01)
  *F16B 11/00* (2006.01)
  *F16B 19/02* (2006.01)
  *F16B 31/02* (2006.01)
  *F16B 5/04* (2006.01)

(58) Field of Classification Search
  USPC ............... 403/27, 375, 381, 408.1; 116/212;
  73/761, 810, 822, 834, 835, 845; 411/8,
  411/9, 13, 14
  See application file for complete search history.

(56) References Cited

U.S. PATENT DOCUMENTS

| | | | |
|---|---|---|---|
| 5,088,867 A | | 2/1992 | Mun |
| 5,120,168 A | * | 6/1992 | Padula ............... F16B 31/021 411/5 |
| 5,129,452 A | * | 7/1992 | Wilson ............... E21B 17/1035 166/242.2 |
| 5,713,705 A | * | 2/1998 | Grunbichler ......... F16B 31/021 411/410 |
| 6,083,604 A | * | 7/2000 | Haraga ............... F16B 5/00 403/375 |
| 7,341,391 B2 | * | 3/2008 | Nakahori ............ F16B 7/0426 403/170 |
| 8,540,453 B2 | * | 9/2013 | Hethcock ............ F16B 5/0266 403/166 |
| 8,782,899 B2 | * | 7/2014 | Draht .................. F16B 15/06 156/92 |
| 2002/0014572 A1 | | 2/2002 | Albritton |
| 2005/0244215 A1 | | 11/2005 | Prat et al. |
| 2006/0067806 A1 | | 3/2006 | Denslow |
| 2009/0139341 A1 | | 6/2009 | Cooper |
| 2009/0191019 A1 | * | 7/2009 | Billings ............... F16B 31/00 411/5 |
| 2009/0194224 A1 | * | 8/2009 | Jendrny ............... B21J 15/02 156/92 |
| 2011/0164918 A1 | * | 7/2011 | Cosentino ............ B64C 1/12 403/266 |
| 2013/0102942 A1 | | 4/2013 | Tanaka et al. |

FOREIGN PATENT DOCUMENTS

| | | | | |
|---|---|---|---|---|
| DE | 196 10 749 A1 | | 9/1997 | |
| DE | 10 2009 009 112 A1 | | 11/2010 | |
| DE | 102012109517 A1 | * | 4/2014 | ............... F16B 5/02 |
| EP | 0 623 758 A2 | | 11/1994 | |
| EP | 1 343 005 A2 | | 9/2003 | |
| EP | 2 423 518 A2 | | 2/2012 | |
| GB | 1 471 666 A | | 4/1977 | |
| JP | 49-120961 U | | 10/1974 | |
| JP | 6-503153 A | | 4/1994 | |
| JP | 5144834 B2 | | 2/2013 | |
| WO | WO 2006/102566 A2 | | 9/2006 | |
| WO | WO 2009/094775 A1 | | 8/2009 | |
| WO | WO 2011/038338 A2 | | 3/2011 | |

OTHER PUBLICATIONS

Machine English translation of document B10 (DE 42 21 607 C1) previously filed on Jun. 4, 2015 (eight (8) pages).
International Search Report (PCT/ISA/220 and PCT/ISA/210) dated May 8, 2014 with English translation (10 pages).
German-language Written Opinion (PCT/ISA/237) dated May 8, 2014 (six pages).
European Office Action issued in European counterpart application No. 13 828 767.7-1760 dated Feb. 21, 2017 (Four (4) pages).
Japanese Office Action issued in Japanese counterpart application No. 2015-545664 dated Sep. 26, 2017 (Four (4) pages).
Chinese Office Action issued in Chinese counterpart application No. 201380063771.9 dated Aug. 23, 2017 (Six (6) pages).

* cited by examiner

INDICATION BOLT FOR MONITORING ADHESIVE BONDS IN STRUCTURAL ELEMENTS

FIELD OF THE INVENTION

The invention relates to a structural element, an aircraft, and a method for detecting damage to a structural element.

BACKGROUND OF THE INVENTION

Bonded joints can be used in order to produce a connection between two elements or components, for example of a vehicle. Here, a distinction is made between primarily bonded joints, in which the bonding process is carried out over the period of time in which the two elements are also shaped (for example in a press), and secondarily bonded joints, in which the components are bonded to one another subsequently.

In the case of a bonded joint of a supporting structural element, it may be important to check for operation-induced damage. Most bonded joints are no longer accessible from all sides following the joining and assembly to form the overall structure, and therefore can no longer be examined well by visual inspection.

In aviation, secondarily bonded joints currently are not admissible, since it generally is not possible to easily check whether or not a secondarily bonded joint is damaged.

Known methods for the non-destructive testing of bonded joints include, for example, ultrasound and thermography. However, these methods can be applied only to a limited extent or can be used only with difficulty in the case of large wall thicknesses or thickness changes of the glue line.

In the case of a faulty bonding as well, in which only under load is a gap produced between the components no longer correctly bonded (what are known as kissing bonds), it is often not possible to discover any faults using the above-mentioned methods.

For these reasons additional clamping bolts are often used with bonded joints. The bolts are designed to carry the load of the joint when the bonded joint is damaged. Such clamping bolts may then delay a further spread of damage, but may also prevent detection of the damage.

SUMMARY OF THE INVENTION

The object of the invention is to provide a simply constructed structural element that can be easily examined for damage.

This object is achieved in accordance with embodiments of the invention.

A first aspect of the invention concerns a structural element, for example a structural element of an aircraft, land vehicle or watercraft. The structural element, however, may also be part of other apparatuses, such as a wind turbine. A structural element can be designed to be exposed to a load acting on the vehicle or the apparatus. By way of example, the structural component may be part of the supporting structure of the vehicle.

The structural element comprises a first component and a second component, which for example may be flat and/or plate-like components, which are bonded to one another. Both components or elements can consist of metal or plastic or may comprise metal and/or plastic. A plastic of this type may be a carbon fiber reinforced plastic, for example.

The two components are interconnected by use of a bonded joint, which for example is provided between the two components. The bonded joint may be a secondary bonded joint. In other words, the two components may have been formed or produced separately from one another and then bonded to one another.

The bonded joint or bonding, which may comprise a layer made of solidified adhesive, may be a structural bonding of fiber composite material elements or a repair bonded joint in fiber composite materials.

In accordance with one embodiment of the invention, the structural element comprises an indication bolt, which is fixed to the first component and the second component. In other words, the indication bolt, such as a rivet, can be connected to the structural element, but does not have to be secured to the individual components. It is possible, however, that the indication bolt is connected, for example bonded, at least in portions to the first and/or second component.

The indication bolt is designed to indicate when the first component and the second component have moved relative to one another. An indication bolt may be a pin, bolt or elongate member (made of metal, plastic and/or glass), which can be fixed to both components and by which a relative movement of the two components can be proven or detected.

If the bonding between the two components is damaged in the region of the indication bolt and if the structural component is exposed to a load, the two components may move relative to one another (for example may be distanced from one another temporarily), since the bonded joint no longer bonds these to one another fully at least in this region.

A failure of the bonded joint by adhesion failure (in which the adhesive layer fails) or cohesion failure (in which the bonded material fails) leads in the event of a loading of the structural element to a (increased) relative movement of the two components. This relative movement causes the indication bolt to deform, break off, shatter, crack and/or change in another way such that it is possible to determine at the indication bolt that a relative movement has occurred. This relative movement, for example, may include a shear movement of the two components and/or a lifting of the two components from one another.

In other words, the indication bolt is a bolt for indicating damage to a bonded joint.

The indication bolt can be formed as a non-supporting indication bolt. In other words, the indication bolt may make hardly any, or only a small contribution to the strength of the bond of the two components. An indication bolt of this type can be formed particularly easily in particular, such that weight for the structural element can be saved with identical load-bearing capability.

A bonded joint of a structure can be monitored with the indication bolt.

In accordance with one embodiment of the invention, the indication bolt is designed to plastically deform when the first component and the second component have moved relative to one another. By way of example, it may deflect permanently and/or a crack may form. With these changes it can be detected later (in a simple case by visual check) whether a relative movement has taken place.

In accordance with one embodiment of the invention, the indication bolt is fixed to the first component and the second component in such a way that it indicates when the relative movement of the first component and of the second component is greater than a predetermined limit value. By way of example, the indication bolt is secured to the two components with slight play, such that the indication bolt is then deformed only when the two components have moved to such an extent that the play has been balanced.

One or more indication bolts can be mounted at critical points of the structural element, at which the relative movement in the event of failure of the bonded joint is particularly high. The failure load of an indication bolt can also be adapted to the rigidity of the surrounding structural element.

In accordance with one embodiment of the invention, the indication bolt is received in an opening in the structural element, which opening at least in the first component and/or the second component has a diameter that is larger than a diameter of the indication bolt. Due to a spacing between the indication bolt and the opening, the predetermined limit value can be defined in order to be able to move the two components relative to one another without the indication bolt indicating a relative movement.

In accordance with one embodiment of the invention, the indication bolt has a predetermined breaking point, which deforms under a predetermined loading of the indication bolt and/or breaks under a predetermined loading of the indication bolt. By way of example the predetermined breaking point may be a narrowed region of the indication bolt. When the indication bolt has a head and a foot, the predetermined breaking point may be arranged between the head and foot.

In accordance with one embodiment of the invention, the indication bolt has a head, which is fixed to the first component, and the indication bolt has an elongated foot, which is fixed to the second component. By way of example, the head can be thickened in relation to the foot, such that it does not fit through an opening in the first and the second component, but the foot does. The foot, for example, may also have a thickening, which does not fit through this opening, or can be bonded and/or screwed to the second component.

In accordance with one embodiment of the invention, the head deflects under a predetermined loading of the indication bolt in relation to the foot. In this way it is possible to determine by a simple visual inspection whether damage to the bonded joint is possible.

In accordance with one embodiment of the invention, the head (or part of the head) detaches from the foot under a predetermined loading of the indication bolt. If the head is marked in color, the absence of the head can thus be determined in a simple manner.

In accordance with one embodiment of the invention, the indication bolt has a head, which is recessed in the first component, such that the first component together with the head has a flat surface. When the head is bent or is no longer present it is possible to determine whether the indication bolt has deformed, for example by feeling the surface.

In accordance with one embodiment of the invention, the indication bolt comprises a closed cavity, which is opened in the event of deformation of the bolt. The bolt may have the form of a pipe (closed at the ends). If the bolt is opened, a material or a substance (liquid, gaseous or solid) can leak from the bolt, on the basis of which the deformation of the indication bolt can be determined. By way of example, the cavity contains a detectable substance, for example a signal color and/or an odorous substance.

In accordance with one embodiment of the invention, the indication bolt is riveted to the structural element. The indication bolt may thus be fixed to the structural element in that it is inserted through an opening in the structural element and the other end of the indication bolt is thickened in such a way that the indication bolt can no longer fall out of the opening.

In accordance with one embodiment of the invention, a foot of the indication bolt is screwed into at least the second component. The foot, however, may also be screwed additionally to the first component. In this way the opening does not have to penetrate the second component fully, but may reach only partially through the second component. The load-bearing capacity of the structural component can be increased in this way.

A further aspect of the invention concerns an aircraft comprising a structural element as described above and below. Generally, the indication bolt can be used, for example, with a bonded joint of elements of a vehicle, such as an aircraft, an airplane, a land vehicle, a car, truck, bus, a watercraft, a ship, or a sailing boat. The indication bolt, for example, can also be used with a bonded joint of elements of a wind turbine, for example the blades thereof.

A further aspect of the invention concerns a method for detecting damage to a structural element, said method comprising the following steps: fixing an indication bolt on a first component and a second component of the structural element, which are bonded to one another; and detecting a deformation of the indication bolt that is produced as a result of the fact that the first component and the second component move relative to one another away from one another on account of damage to the bonded joint.

The detection is possible for example by way of an optical detection, which can be carried out directly by a maintenance technician without further aids. A protruding, slanted and/or chipped head of the indication bolt can be identified by a simple visual inspection.

An acoustic detection is also possible, for example via sounds that are emitted by a failing indication bolt. By way of example, an overpressure may be present in a cavity in the interior of the bolt, which overpressure escapes if the bolt is damaged and in so doing emits a characteristic sound. This sound can be recorded, for example, by a sensor and can be analyzed later.

In accordance with one embodiment of the invention, the method also comprises the step of detecting the deformation by way of (the detection of) a substance that leaks from the indication bolt when the bolt is deformed.

Here, for example, a chemical detection of the leaking substance is possible, which for example can be detected by a sensor and can be analyzed. The leakage of an odorous substance can also be perceived, for example, by a maintenance technician or a person in the vicinity of the structural element without aids.

It is also possible that a dye leaks out from the bolt following the deformation or damage. The dye or a color, such as a signal color, may dry in the vicinity of the bolt, for example on the surface of the first component, and may leave behind there a permanent indication of the deformation of the bolt.

In accordance with one embodiment of the invention, the method also comprises the step of detecting the deformation by a change of an electrical property of the indication bolt. It is possible in this way to detect a deformation and/or damage of the indication bolt that is not possible with the naked eye.

By way of example, the indication bolt can be examined by use of eddy currents. Eddy current measuring devices, with which an imaging method can also be used, are widespread and generally can be operated easily.

It is also possible to carry out a resistance measurement on the indication bolt. If the indication bolt for example is broken in such a manner that the break is not visible from outside, the electrical resistance of the bolt however may be significantly increased.

It is to be understood that the detection possibilities can be applied individually or in combination.

Exemplary embodiments of the invention will be described hereinafter in detail with reference to the accompanying figures.

BRIEF DESCRIPTION OF THE FIGURES

In principle, identical or similar parts are provided with like reference signs.

DETAILED DESCRIPTION OF EXEMPLARY EMBODIMENTS

Figure 1:
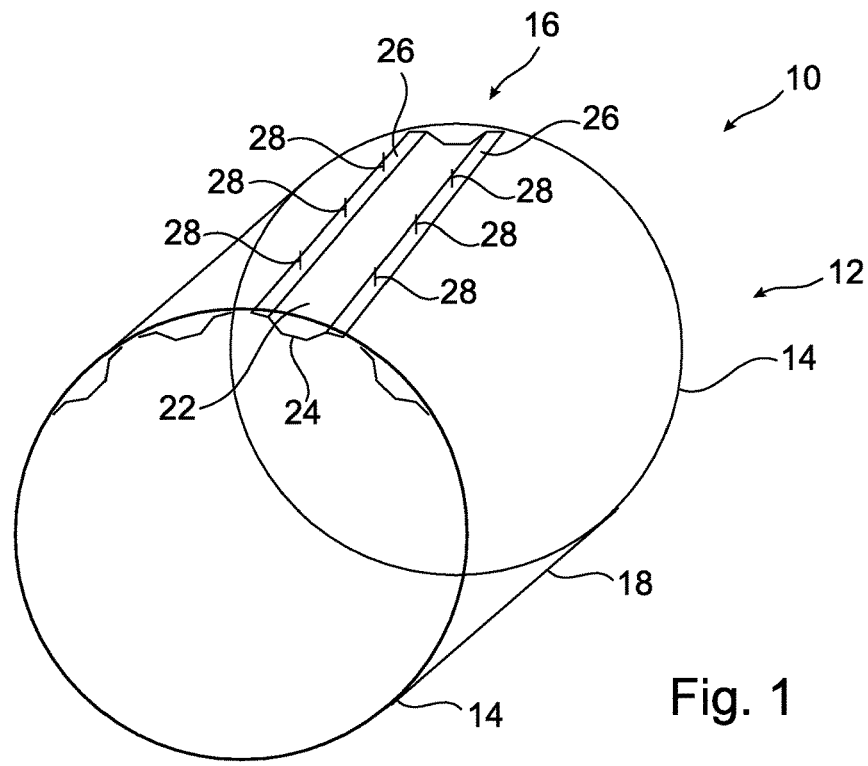
FIG. 1 shows a schematic three-dimensional view of a supporting structure of an aircraft in accordance with one embodiment of the invention.

FIG. 1 shows a detail of a supporting structure 10 of an aircraft 12, which has an outer skin 18 stiffened by formers 14 and stringers 16. The stringers 16 comprise bonded reinforcements, which run in a longitudinal direction of the aircraft 10.

Figure 2:
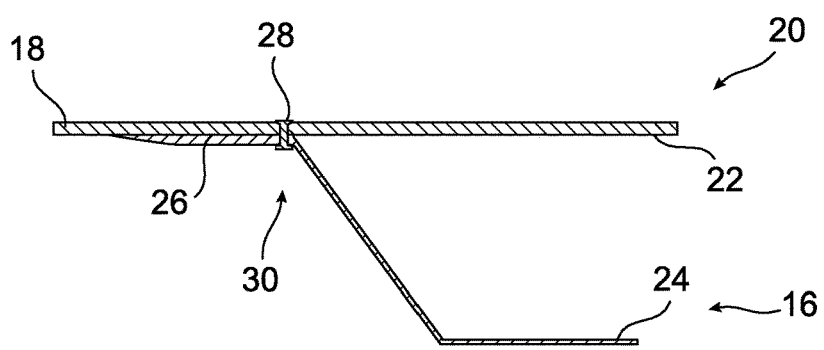
FIG. 2 shows a schematic cross section through a structural element in accordance with one embodiment of the invention.

FIG. 2 shows a detail from FIG. 1 with a structural element 20, which shows part of the outer skin 18 and part of a stringer 16. Here, the stringer 16 is formed by an outer shell 22, which forms part of the outer skin 18, and an inner shell 24, which is bonded to the outer shell 22. On the whole, the supporting structure has a shell structure with glued-in reinforcements.

The outer shell 22 here represents a first component 22 of the structural element 20, which is connected to the inner shell 24 as second component 24 via a bonded joint 26 in the form of a glue line.

The first component 22 and the second component 24 are additionally connected via an indication bolt 28, which is arranged in a region 30 such that it is exposed to a high load in the event of failure of the bonded joint 26.

As is clear from FIG. 1, one or more bonded joints 26 between the two components 22, 24 can be secured in each case via a number of indication bolts 28.

Figure 3:
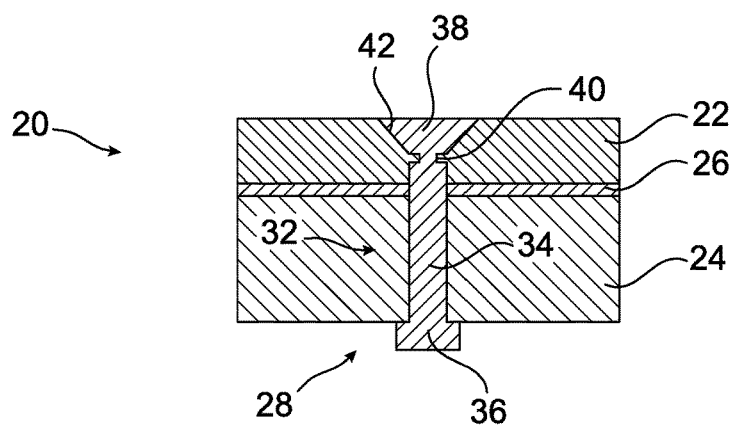
FIG. 3 shows a schematic cross section through a structural element having an undamaged indication bolt in accordance with one embodiment of the invention.

FIG. 3 shows a detail from FIG. 2. In a surrounding environment of the indication bolt 28, the two components 22, 24 can be constructed in a planar and/or plate-like manner. The bonded joint 26 may comprise a layer of adhesive material between the two components 22, 24.

The indication bolt 28 is received in an opening 32 in the structural element 20 and is fixed to the structural element 20. For this purpose, the indication bolt 28 has a foot 34, which is fixed by way of a thickening 36 to the second thickening, such that the indication bolt 28 is held on the second component 24 in the opening 32. The indication bolt 28 also has a head 38, which is thickened in relation to the foot 34, such that the indication bolt 28 is also held on the first component 22 in the opening 32.

When the bonded joint 26 is damaged and the two components 22, 24 are loaded by forces and loads that are exerted onto the structural component 20, a relative movement beyond a predetermined limit value may be produced. By way of example, the two components 22, 24 may lift from one another and/or may shift along the bonded joint 26.

The predetermined limit value can be set, for example, via the resilient behavior of the indication bolt 28 or via a play between the indication bolt 28 and the first component 22 and/or the second component 24. By way of example, the opening 32 has a diameter that is slightly larger than the diameter of the foot 34 of the indication bolt 28.

In the case of a sufficient large relative movement of the two components 22, 24, the indication bolt is then loaded in such a way that, for example, the head 38 thereof is sheared off or at least bent.

Between the head 38 and the foot 34, the indication bolt 28 has a predetermined breaking point 40, which constitutes a narrowed portion of the indication bolt 28. The size of the predetermined breaking point 40 is coordinated such that the predetermined breaking point 40 at least permanently deforms or tears in the event of a determined load on the indication bolt 28.

Figure 4:
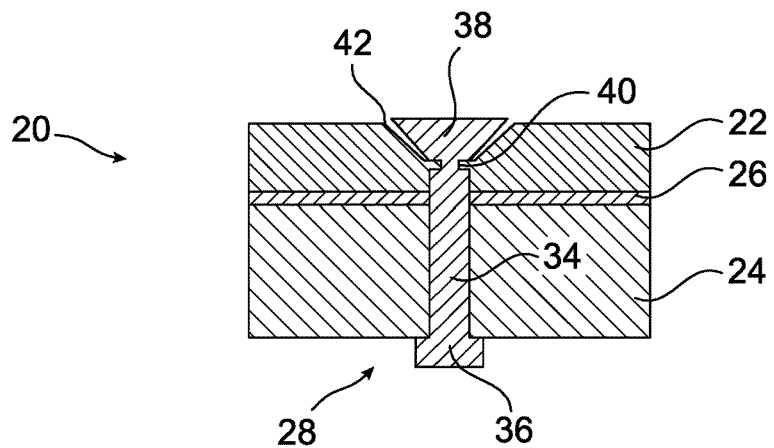
FIG. 4 shows a schematic cross section through a structural element having a damaged indication bolt in accordance with one embodiment of the invention.

FIG. 4 shows that the head 38 of the indication bolt 28 can be shifted or bent by a deformation of the indication bolt 28 relative to the foot 34.

As is clear from FIG. 3, the head 38 can be received, for example, in an indentation 42, such that the surface of the head 38 is flush with the surface of the first component 22 when the indication bolt 28 is not deformed. Following the deformation, the head 38 may protrude beyond the indentation, such that a deformation of the indication bolt 28 is easily visible from outside as well.

Figure 5:
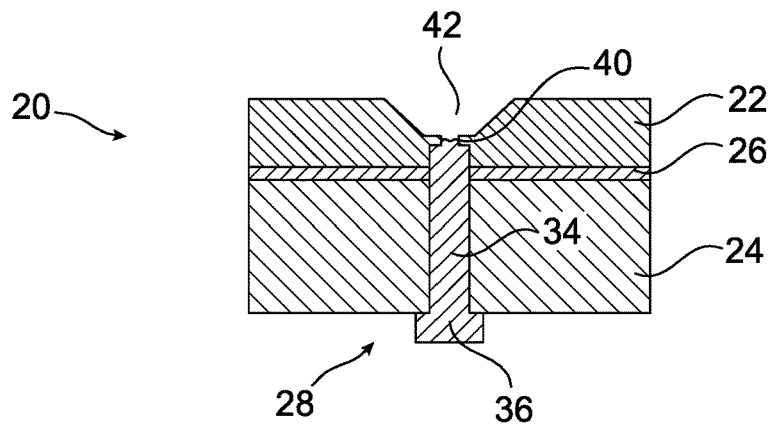
FIG. 5 shows a schematic cross section through a structural element having a damaged indication bolt in accordance with one embodiment of the invention.

FIG. 5 shows that the head 38 in the event of deformation of the indication bolt 28 can also be fully separated from the foot 34, such that the indentation 42 is exposed.

Figure 6:
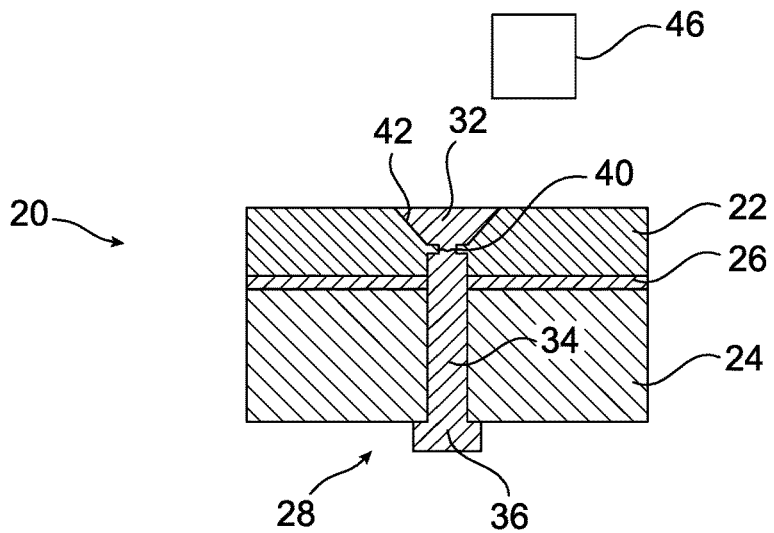
FIG. 6 shows a schematic cross section through a structural element having a damaged indication bolt in accordance with one embodiment of the invention.

Although, as is shown in FIG. 6, the head 38 of the indication bolt 28 does not exhibit visible deformation, a crack 44, for example through the predetermined breaking region 40, can be detected by way of a measuring device or sensor 46, which for example determines eddy currents in the indication bolt 28 or electrical resistance thereof.

Figure 7:
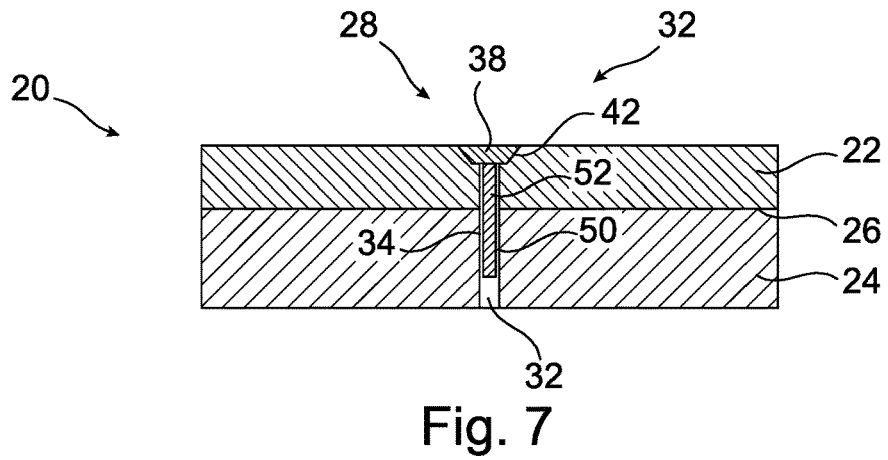
FIG. 7 shows a schematic cross section through a structural element having an undamaged indication bolt in accordance with one embodiment of the invention.

In FIG. 7 it is illustrated that the indication bolt 28 may have a cavity 50, in the interior of which a substance 52 is enclosed when the indication bolt 28 is not deformed.

If the indication bolt 28 deforms, for example in that the head 38 is sheared off in part, a connection from the cavity 50 outwardly is produced, and the substance 52, for example a signal color, can escape from the indication bolt 28.

In FIG. 7, it is additionally shown that the opening 32 can penetrate the two components 22, 24 fully, or however also penetrates the second component 24 only partially. In both cases the indication bolt 28 can be screwed or glued into the second component 24.

Figure 8:
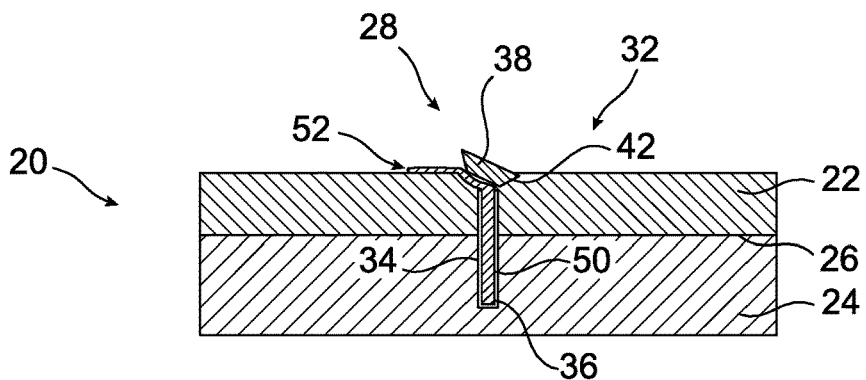
FIG. 8 shows a schematic cross section through a structural element having a damaged indication bolt in accordance with one embodiment of the invention.

FIG. 8 shows a method for detecting damage to the structural element 20, in which it is determined whether the two components 22, 24 have loaded the indication bolt 28 to such an extent that the indication bolt has deformed.

Figure 9:
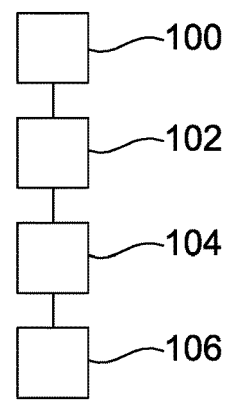
FIG. 9 shows a flow diagram for a method for detecting a defective bonded joint in accordance with one embodiment of the invention.

Referring to the flow chart of FIG. 9, in step 100, the two components 22, 24 are bonded, such that the bonded joint 26 is produced.

In step 102, an opening 32 through the two components 22, 24 is produced. By way of example, the opening can be provided already during the production of the components 22, 24 or can be drilled subsequently in the two components 22, 24. The opening 32 can be produced at the same time as the bonding in step 100, beforehand, or subsequently.

In step 104, an indication bolt 28 is inserted into the opening 32. The indication bolt 28 does not have to be rigidly connected to both components 22, 24, but can be fixed merely in the opening 32 such that it is loaded when the two components 22, 24 move relative to one another. The fixing can be provided in part to the conical head 38, for example.

The foot 34 of the indication bolt 28 for example can be screwed and/or glued into one of the components 22, 24. The indication bolt 28 can also be held in the opening 32 by way of a rivet connection.

The structural element 20 can then be used for its intended purpose. If the bonded joint 26 is damaged (for example by an overload or by material fatigue), the two components 22, 24 can move relative to one another (beyond a predetermined limit value). The indication bolt 28 is configured or designed such that it starts to deform when this limit value is exceeded.

Due to the deformation of the indication bolt 28, the head 38 of the indication bolt 28 for example may be bent or sheared off and/or a cavity 50 in the interior of the indication bolt 28 may be opened as shown in FIG. 8.

In step 106, the integrity of the indication bolt 28 is tested. This can be performed by visual check, by means of a measuring device and/or a sensor 46.

With a visual check it is possible to determine whether the head 38 of the indication bolt 28 is bent or still present or whether a signal color 52 has leaked. A bent or absent head 38 or the presence of a signal color 52 indicates that the bonded joint 26 has been damaged.

With a measuring device or sensor 46, an eddy current measurement can be carried out on the indication bolt 28, or an electrical resistance of the indication bolt 28 can be determined. If the eddy current or the resistance falls below a predetermined value, this indicates damage to the bonded joint 26.

With a measuring device or sensor 46, a substance 52 leaking from the indication bolt 28 can be detected (for example whilst the substance is leaking). This can be implemented simultaneously during the intended use of the composite element 20. With a measuring device or sensor 46, a sound that is emitted by the indication bolt 28 in the event of deformation or shattering can also be recorded. The sensor values can be recorded and analyzed later. A sounding of the measuring device or sensor 46 or certain sensor values then indicates damage to the bonded joint 26.

Figure 10:
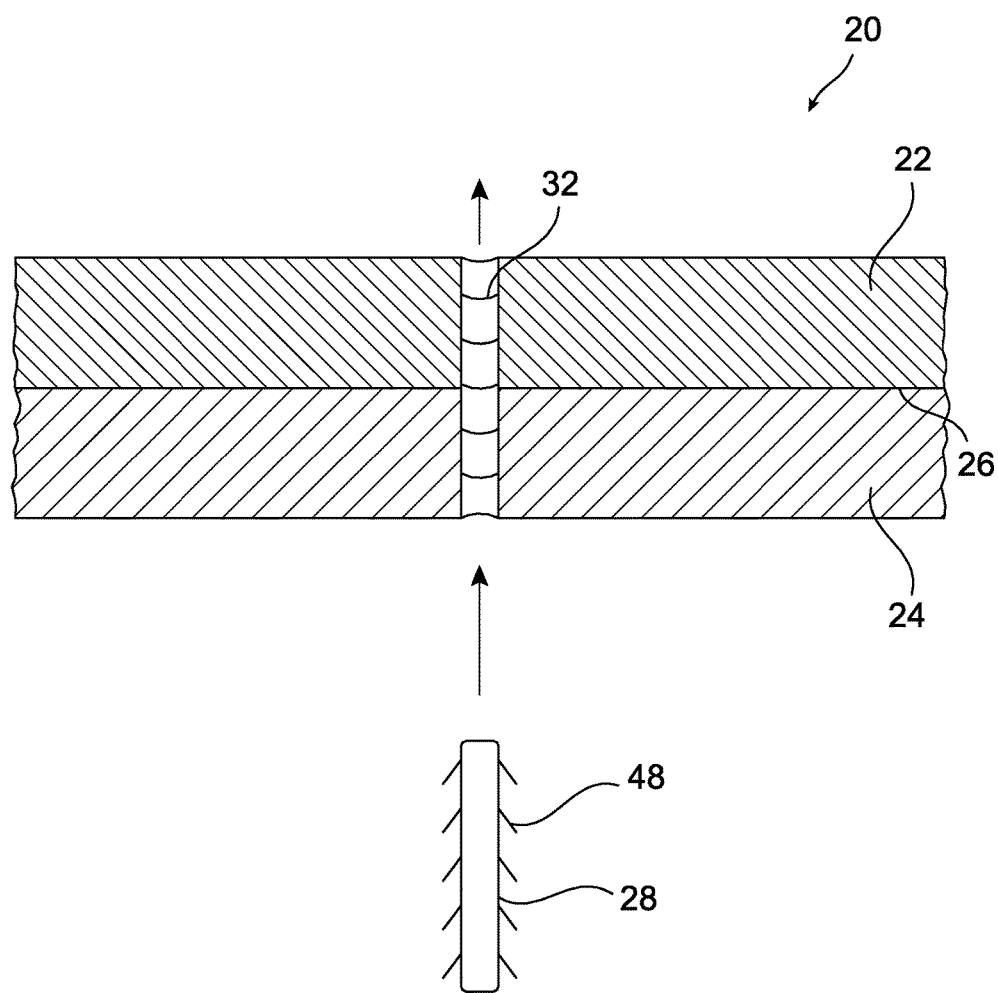
FIG. 10 shows a schematic cross section through a structural element having an indication bolt in accordance with one embodiment of the invention.

FIG. 10 shows a further embodiment of an indication bolt 28, which is designed to move in a predefined direction in the event of a lifting of the joint 26. The indication bolt 28 for example may have barbs 48 or corrugations (asymmetric with respect to the direction). When, for example, the two components 22, 24 lift a number of times from one another, the indication bolt 28 moves in the direction described by the arrow. It is then possible to check by visual check whether the indication bolt 28 protrudes from the opening 32, which indicates that the bonded joint 26 is defective.

In addition, it is noted that "comprising" does not rule out any other elements or steps, and "a" or "one" does not rule out a plurality. It is also noted that features or steps that have been described with reference to one of the above exemplary embodiments can also be used in combination with other features or steps of other above-described exemplary embodiments. Reference signs in the claims are not to be considered as limiting.

The invention claimed is:

1. A structural element, comprising:
   a first component and a second component;
   a bonded joint, by which the first component and the second component are interconnected; and
   an indication bolt, which is fixed to the first component and the second component,
   wherein the indication bolt is designed to indicate when the first component and the second component have moved relative to one another,
   wherein the indication bolt has a predetermined breaking point, which deforms under a predetermined loading of the indication bolt introduced by the relative movement of the first and second component or breaks under the predetermined loading of the indication bolt introduced by the relative movement of the first and second component to detect whether the relative movement of the first component and the second component has taken place,
   wherein the predetermined breaking point is a narrowed region adjacent to a head of the indication bolt.

2. The structural element as claimed in claim 1, wherein the indication bolt is designed to plastically deform when the first component and the second component have moved relative to one another.

3. The structural element as claimed in claim 1, wherein the indication bolt is received in at least one opening in the first component and/or second component, wherein the at least one opening in the first component and/or the second component has a diameter that is larger than a diameter of the indication bolt.

4. The structural element as claimed in claim 1, wherein the head of the indication bolt is fixed to the first component, and the indication bolt has an elongated foot, which is fixed to the second component, wherein the head deflects under a predetermined loading of the indication bolt in relation to the foot, or wherein the head detaches from the foot of the indication bolt under a predetermined loading of the indication bolt.

5. The structural element as claimed in claim 1, wherein the head of the indication bolt is recessed in the first component, such that the first component together with the head form a flush surface.

6. The structural element as claimed in claim 1, wherein the indication bolt comprises a cavity, which is opened in the event of deformation of the indication bolt.

7. The structural element as claimed in claim 6, wherein the cavity contains a detectable substance.

8. The structural element as claimed in claim 6, wherein the cavity contains a signal color substance.

9. The structural element as claimed in claim 1, wherein the indication bolt is riveted to the structural element.

10. The structural element as claimed in claim 1, wherein a foot of the indication bolt is screwed into at least the second component.

11. An aircraft, comprising:
a structural element comprising:
- a first component and a second component;
- a bonded joint, by which the first component and the second component are interconnected; and
- an indication bolt, which is fixed to the first component and the second component,
- wherein the indication bolt is designed to indicate when the first component and the second component have moved relative to one another,
- wherein the indication bolt has a predetermined breaking point, which deforms under a predetermined loading of the indication bolt introduced by the relative movement of the first and second component or breaks under the predetermined loading of the indication bolt introduced by the relative movement of the first and second component to detect whether the relative movement of the first component and the second component has taken place,
- wherein the predetermined breaking point is a narrowed region adjacent to a head of the indication bolt.

* * * * *